Patented Apr. 27, 1943

2,317,586

UNITED STATES PATENT OFFICE 2,317,586

RUBBERLIKE PRODUCTS FROM DERIVATIVES OF CASHEW NUT SHELL LIQUID AND METHOD FOR PRODUCING THE SAME

Solomon Caplan, New York, N. Y., assignor to The Harvel Corporation, a corporation of New Jersey No Drawing. Application February 13, 1940, Serial No. 318,707

8 Claims. (Cl. 260—46)

The present invention relates to a method of polymerizing phenolic compounds having unsaturated hydrocarbon substituents and to the products obtained thereby.

According to the present invention phenolic compounds having unsaturated hydrocarbon substituents on the aryl nucleus are polymerized by contact with hydrogen fluoride, preferably in a substantially anhydrous condition. Examples of phenols and other phonlic compounds having unsaturated hydrocarbon substituents and suitable for the practice of the present invention are those derived from the Anacardiaceae family of plants such as cashew nut shell liquid, marking nut shell liquid, japanese lac (urushiol) and the constituents of these such as anacardic acid, cardol, anacardol and urushiol; and derivatives of these such as cardanol, hydrocarbon ethers of cashew nut shell liquid, of marking nut shell liquid and of urushiol; hydrocarbon ethers of cardanol and other derivatives and generally those phenolic compounds having unsaturated hydrocarbon substituents disclosed in my Patent Number 2,181,119, issued November 28, 1939, to which reference is hereby made. The phenolic compounds suitable for the practice of the present invention can be stated generally to be phenolic compounds having from twelve to thirty carbon atoms in the hydrocarbon substitutents.

The polymerization reactions of the present invention can be produced by passing anhydrous hydrogen fluoride through a body of the phenolic compound at normal temperature and also at temperatures below normal and at temperatures above normal, for example, in a range of temperature from about −10° C. to about 300° C. This is done preferably in a closed container to save the hydrogen fluoride gas and use it over and over again, with a closed circulating and pumping system for returning the hydrogen fluoride into the body of phenolic material being treated as it emerges from that body after a previous contact in that body.

The products of the present invention can be predetermined to be of a desired viscosity or consisting of a liquid of slightly higher viscosity than that of the phenolic material being polymerized, through heavier liquids, to solid, rubber-like consistencies.

The method of the present invention has the advantage that polymerization can be obtained without oxidation such as occurs or tends to occur with some polymerization products and has also the advantage that the vesicating action of Anacardiaceae phenols is reduced or completely overcome. Also, with the method of the present invention, naturally occurring metals can be precipitated from the Anacardiaceae phenols by the hydrogen fluoride and removed before continued treatment to polymerize or to continue to polymerize the material being treated.

Having thus described my invention, what I claim and desire to protect by Letters Patent is:

1. The method for producing a solid rubber-like product from a material selected from the group consisting of cardanol, hydrocarbon ethers of cardanol and hydrocarbon ethers of cashew nut shell liquid comprising treating said material with substantially anhydrous hydrofluoric acid.

2. The method for producing a solid rubber-like product from cardanol comprising treating said cardanol with substantially anhydrous hydrofluoric acid.

3. The method for producing a solid rubber-like product from a hydrocarbon ether of cardanol comprising treating said hydrocarbon ether of cardanol with substantially anhydrous hydrofluoric acid.

4. The method for producing a solid rubber-like product from a hydrocarbon ether of cashew nut shell liquid comprising treating said hydrocarbon ether of cashew nut shell liquid with substantially anhydrous hydrofluoric acid.

5. A solid rubber-like product obtained by treating with substantially anhydrous hydrofluoric acid a material selected from the group consisting of cardanol, hydrocarbon ethers of cardanol and hydrocarbon ethers of cashew nut shell liquid.

6. A solid rubber-like product obtained by treating cardanol with substantially anhydrous hydrofluoric acid.

7. A solid rubber-like product obtained by treating a hydrocarbon ether of cardanol with substantially anhydrous hydrofluoric acid.

8. A solid rubber-like product obtained by treating a hydrocarbon ether of cashew nut shell liquid with substantially anhydrous hydrofluoric acid.

SOLOMON CAPLAN.